July 2, 1929.  V. E. LEGG  1,719,479

COMPOSITE CONDUCTOR

Filed Oct. 6, 1926

Inventor:
Victor E. Legg.
by
Attorney

Patented July 2, 1929.

1,719,479

UNITED STATES PATENT OFFICE.

VICTOR E. LEGG, OF MONTCLAIR, NEW JERSEY, ASSIGNOR TO BELL TELEPHONE LABORATORIES, INCORPORATED, OF NEW YORK, N. Y., A CORPORATION OF NEW YORK.

COMPOSITE CONDUCTOR.

Application filed October 6, 1926. Serial No. 139,776.

This invention relates to the construction of composite conductors, and more particularly to the construction of signaling conductors continuously loaded with material having high permeability.

The general object of this invention is the production of a composite metallic strand. One example of such a strand is a continuously loaded signaling conductor.

A more specific object of the invention is to so produce a loaded conductor, the loading material of which requires heat treatment when in place on the conductor, as to prevent the loading material from adhering to the conductor in consequence of the heat treatment.

Until comparatively recently iron has been considered to be the only material suitable for the continuous loading of signaling conductors. It has been discovered, however, that more suitable materials may be produced in the form of alloys. When nickel and iron are alloyed in proper proportions and the alloy is given a proper heat treatment, a material having high permeability at low magnetizing forces is obtained. A preferred composition comprises 78½% nickel and 21½% iron. Another magnetic allow suitable for loading purposes comprises nickel, iron and cobalt in the proportions of approximately 45% nickel, 30% iron and 25% cobalt. After a proper heat treatment the permeability of this alloy at low magnetizing forces shows only small variations with varying flux densities. Other properties possessed by these alloys which increase their value as loading materials are low hysteresis loss and high resistivity, both conducive of increasing the efficiency of the conductor.

When it was attempted to employ these materials either in the form of tape or wire for the continuous loading of a conductor difficulties were encountered. Desired qualities of these materials may be obtained by proper heat treatment but, when this heat treatment is applied prior to the placing of the material upon the conductor, some of these qualities are deleteriously affected due to the mechanical strains incident to the application process; hence the heat treatment is applied to the completed conductor. In order to obtain the high magnetic quality of the nickel-iron and nickel-iron-cobalt alloys, it is necessary that they be annealed at approximately 900° C. after they have been applied to the copper conductor. The primary magnetic quality desired is minimum hysteresis loss.

In the process of annealing a loaded conductor at about 900° C., the copper expands considerably more than the surrounding loading material and when there is not sufficient slack in the loading material very close contact is established between the two either in the furnace or just after the conductor enters the cooling chamber. Contraction of the loading layer is rapid in the latter stage of the heat treatment due to the cooling medium being applied directly to this layer. Due to the increased molecular activity at the elevated temperature of 900° C., diffusion between the two metals appears to be established and welding or adhesion to take place over portions of the contact surfaces. Upon cooling the copper conductor tends to draw away from the magnetic loading material and since this material partially adheres to the copper, stresses are set up, thereby deleteriously affecting properties of the loading material.

Various ways of preventing adhesion have been devised. According to the present invention another novel and satisfactory arrangement for preventing adhesion between the conducting core and the loading material of a continuously loaded conductor is provided.

In a particular embodiment of the invention, the stranded or solid conductor is coated with a layer of a highly refractory powder, particularly electrically fused alumina which has a melting point of approximately 2050° C. However, other substances may be used, for instance, corundum, silicon carbide and certain high melting point minerals, such as kaolin, quartz and dehydrated talc. The refractory powder used as a spacing material between the magnetic loading material and the copper conductor must be physically and chemically inert between the temperatures of 400° C. and 1000° C., in order that the copper conductor will not be injured by the formation of reducing or other gases at the annealing temperature of 900°. These substances are preferably applied in powdered form together with a low boiling point binder which is volatile at temperatures below 400° C. Such a binder is glycerine which boils off at a temperature of about 200° C. The magnetic loading wire or tape is applied over the powdered coating which acts as a refractory separator between the core and the magnetic material. The glycerine is evaporated off at a low temperature, approximately 200° C. leaving only the inert refractory powder held in position between the core and magnetic material. Thus all materials which might be injurious to the copper conductor in the final annealing at approximately 900° C., are eliminated and adhesion of the magnetic material to the copper core is prevented so that the best qualities of the magnetic material are obtained.

In the preferred method of obtaining this result the conductor is passed through a chamber containing a fibrous material which is saturated with the viscous, volatile binder, such as glycerine, which has a relatively low boiling point. The conductor thereby receives a coating of glycerine and is then passed through a second chamber containing the powdered refractory substance which forms a coating by adhering to the viscous binder. The magnetic tape or wire is wrapped closely around the refractory separator in helical form and the composite conductor is fed to an electric oven for preliminary heat treatment. During this treatment the binder is boiled off completely and the gases and vapors present are removed by a draft of air injected through the furnace. This arrangement results in the removal of all carbonaceous or other residues which would be detrimental to the copper conductor.

In the following is given a more detailed description of the invention which is illustrated in the accompanying drawings in which.

Figure 1:
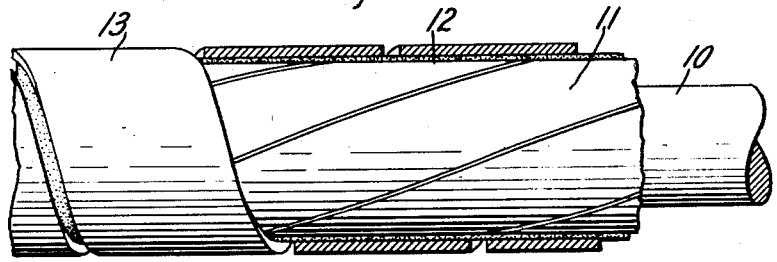
Fig. 1 illustrates a section of a loaded conductor with a portion cut away to more clearly disclose the structure.
Figure 2:
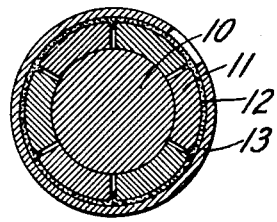
Fig. 2 is a cross-sectional view of the conductor shown in Fig. 1.

Referring to Figs. 1 and 2 the composite conductor consists of a central core 10 around which lies a plurality of flat copper strands 11. A suitable layer 12 of a refractory powder is coated on the strands 11. The refractory substance is preferably fused alumina, although other materials may be used which are inert at temperatures from 400° C. to 1000° C. Such materials may be corundum, silicon carbide or certain high melting point minerals, such as kaolin, quartz and dehydrated talc. These substances are mentioned as being the best known having the desired characteristics of being refractory at high temperatures and inert with respect to the metals contained in the composite conductor. The magnetic tape 13 is wound helically over the refractory layer 12 to form the loaded conductor.

Figure 3:
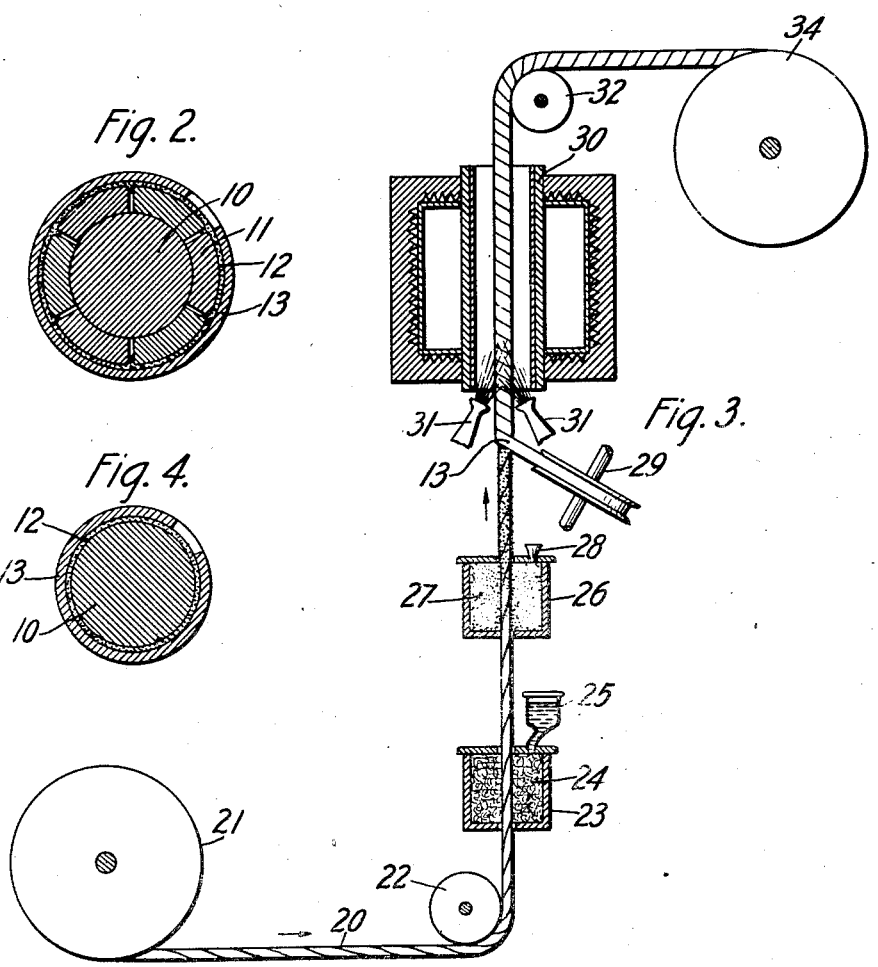
Fig. 3 illustrates a method of applying the refractory separator to the conductor in accordance with this invention.

The preferred method of forming the composite conductor is shown in Fig. 3 in which the conductor is shown to pass through a continuous process of manufacture. The stranded conductor 20 is supplied from a spool 21 and passes over an idler 22, to a chamber 23 having central apertures at the top and bottom. This chamber contains a fibrous material 24 such as cotton waste, which is saturated with a viscous binder, such as glycerine, supplied through a funnel or cup 25. The conductor 20 passes through the apertures in the chamber 23 and due to the motion through the chamber, a suitable coating of the viscous binder is applied thereto. After leaving the chamber 23 the conductor passes through a second chamber 26 containing the powdered refractory substance 27, preferably powdered alumina, which adheres to the viscous binder surrounding the conductor and forms a coating of the desired thickness. This chamber is also supplied with a cup 28 for refilling the chamber with the powdered alumina. After the conductor leaves the chamber 26 the magnetic material 13 is applied helically to the coated conductor from a spool 29 with a sufficient tension to prevent looseness. The conductor then passes through an oven 30, which is maintained at a temperature sufficient for the conductor passing through the oven to attain a temperature of 300° C. dependent on the taping rate and air flow. This temperature is sufficient to boil off or vaporize the volatile glycerine binder. Suitable jets 31 may be located at the entrance of the oven 30, to supply an excess of air to carry away the vapors given up due to the heating of the conductor and to provide slight oxidation of the copper conductor and magnetic material. After leaving the oven the completed conductor passes over an idler 32 and is wound on a take-up reel 34.

In the heat treatment of the conductor passing through the oven, the temperature is sufficient to boil off the glycerine binder, without leaving any residue, and the draft of excess air passing through the furnace completely removes all injurious gases or vapors which would tend to embrittle the copper conductor in the subsequent annealing process at 900° C. The powdered material which is left after the low temperature heat treatment maintains the proper separation of the magnetic material from the stranded conductor during the subsequent high temperature heat treatment to prevent adhesion between the core and the magnetic material. Thus there are no deleterious effects upon the copper core or the alloy loading material.

Figure 4:
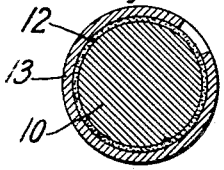
Fig. 4 is a cross sectional view of a modification of the conductor shown in Fig. 1.

The invention is also applicable to a solid conductor, such as shown in Fig. 4, in which the layer of refractory powder is applied to the cylindrical conductor and the magnetic material 13 is applied over the powdered separator.

While by the method described above the desired coating of refractory material is formed on the conductor, it is within the scope of the present invention to apply the binder and the material to the conductor simultaneously, that is, as a paste or a plastic mass of the required consistency to leave a coating or separator of the desired thickness to prevent adhesion between the magnetic material and the conductor during the annealing treatment.

The invention may be utilized with materials other than the nickel-iron or nickel-iron-cobalt alloys to prevent adhesion during heat treatment between such materials and adjacent strands of a composite strand. Furthermore, the invention is also applicable to metallic composite strands other than those used as conductors of electricity.

What is claimed is:

1. The method of producing a composite strand which comprises placing a spacing composition on a strand, building up the composite strand by placing another strand in contact with said spacing composition, and heating said composite strand to volatilize a constituent of said composition.

2. The method of producing a composite strand that is to be subjected to a high temperature which comprises placing a spacing composition on a strand, said composition containing a substance which is inert at the high temperature, building up the composite strand by placing another strand in contact with said spacing material, and subjecting said composite strand to a low temperature heat treatment to render said composition harmless to said strands at high temperature.

3. In a method of producing a composite strand that must be subjected to a high temperature, the steps of placing a composition as a separator between two adjacent strands, said composition containing a substance which is inert at the high temperature, and subjecting the separated strands to a preliminary heat treatment to remove at least one constituent of said composition which would be harmful to one of said strands at the high temperature.

4. In a method of producing a composite strand that must be subjected to comparatively high temperatures, the steps of placing a composition to separate two adjacent strands, and heating the separated strands at comparatively low temperature to render said composition harmless to said strands at the comparatively high temperature.

5. The method of making a composite strand which comprises forming said strand of at least two adjacent strands of different metals, and forming a layer of a viscous binder and a refractory powder between the adjacent strands, and removing said binder by volatilization.

6. The method of producing a composite strand which comprises causing a spacing material to adhere to at least one strand of said composite strand by means of a binder which may be volatilized without leaving a carbonaceous or other deleterious residue, building up the composite strand by placing another strand in contact with the adhering spacing material, and heating said composite strand to volatilize and remove said binder.

7. The method of producing a conductor continuously loaded with a magnetic material which is to be subjected to a heat treatment to improve one of its magnetic properties, which comprises causing a spacing material which will be chemically inert during said heat treatment to adhere to the conductor by means of a binder which may be volatilized without leaving a carbonaceous or other deleterious residue, wrapping the magnetic loading material about said spacing material, and heating said loaded conductor at a temperature lower than that required for the heat treatment of the loading material, to volatilize and remove said binder.

8. The method of making a composite strand consisting of at least two strands of different metals, which comprises treating at least one of said strands with a viscous binder, applying a powdered substance to said treated strand, forming a composite strand of said strands of different metals, and heating said composite strand to vaporize and remove said binder without injuring said treated strand.

9. The method of making a composite strand consisting of at least two strands of different metals, which comprises treating at least one of said strands with a viscous binder, applying a refractory material to said treated strand, forming a composite strand of said strands of different metals, and heating said strand to vaporize said binder without leaving a carbonaceous residue.

10. A method of superposing a metallic material upon an electrical conductor for preventing adhesion between said conductor and superposed metallic material during heat treatment, which consists in coating the conductor with a viscous binder and an aluminous powder, heating said conductor to vaporize said binder, and supplying an excess of air during the heat treatment to drive out vapors without leaving deleterious residues.

11. The method of loading a signaling conductor with a magnetic material which requires heat treatment to increase its permeability, which consists in forming a layer of a refractory substance together with a binder on said conductor, wrapping the magnetic material around said layer, and heating said conductor to remove said binder without leaving any residue and annealing said conductor to increase the permeability of said magnetic material.

12. The method of loading a signaling conductor with a magnetic material which requires heat treatment to increase its permeability, which consists in applying a volatile binder to said conductor, applying a pulverized refractory oxide to said binder, winding the magnetic material about said refractory oxide, and heating the loaded conductor to remove said binder without leaving a carbonaceous residue.

13. In a method of producing a conductor continuously loaded with magnetic material and which is to be subjected to a heat treatment involving a high temperature, the steps of placing a composition as a separator between the conductor and the magnetic material, said composition containing a substance which is inert at the high temperature and heating the loaded conductor to a low temperature to render said composition harmless to the loaded conductor at the high temperature.

14. A composite conductor comprising a wire core having a certain coefficient of expansion under heat treatment, a metallic material wound thereon having a different coefficient of expansion under the same heat treatment, and a refractory powder separator therebetween for preventing cohesion between said conductor and material during heat treatment, said powder separator being inert at and well above the temperature of the heat treatment, said temperature reaching as high as 900 degrees centigrade.

15. A composite conductor comprising a wire core having a coefficient of expansion approximating copper, a metallic material wound thereon having a coefficient of expansion approximating nickel, and a refractory powder between said conductor and material for preventing cohesion of said conductor and material during heat treatment, said powder being inert at and above the temperature of the heat treatment, said temperature varying to as high as 900 degrees centigrade.

16. A composite conductor comprising a wire core, a metallic material wound thereon, said material being subject to adhesion to said core during heat treatment, and a pulverulent inert substance separating said core and material, said substance remaining inert at and above temperature of 900 degrees centigrade.

17. A loaded signaling conductor comprising a central conductor, a magnetic material of high permeability wound upon said conductor, and an inert oxide powder separator between said conductor and material.

In witness whereof, I hereunto subscribe my name this 5th day of October, A. D., 1926.

VICTOR E. LEGG.